John E. Finley
Churn

N° 89,645.  Patented May 4, 1869.

Witnesses
Perry Finley
S. G. Dodge

Inventor
John E. Finley

JOHN E. FINLEY, OF MEMPHIS, TENNESSEE.

Letters Patent No. 89,645, dated May 4, 1869.

IMPROVEMENT IN CHURNS.

The Schedule referred to in these Letters Patent and making part of the same.

Be it known that I, JOHN E. FINLEY, of Memphis, county of Shelby, and State of Tennessee, have invented a new and useful Improvement in Churns; and I do hereby declare that the following is a full, clear, and exact description of the construction and operation of the same, reference being had to the annexed drawings making a part of this specification, in which—

Figure 1:
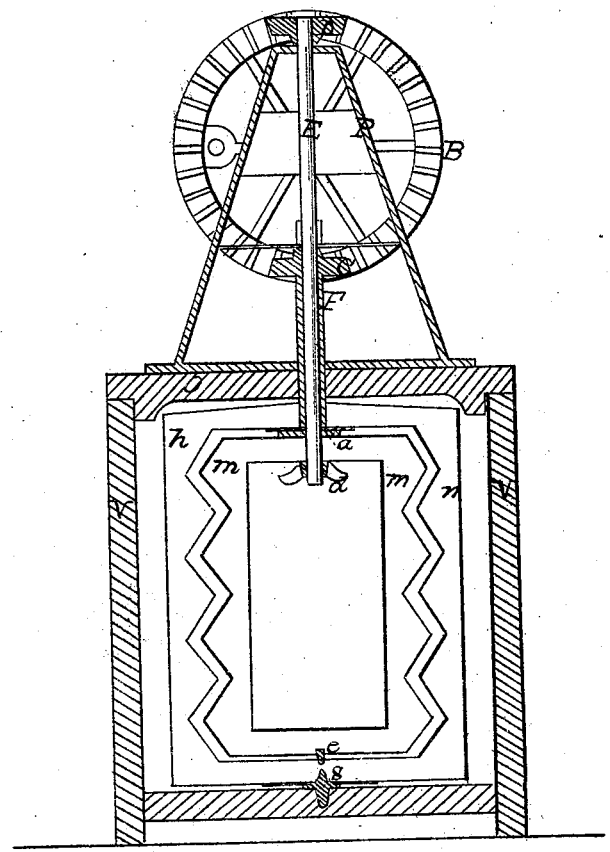
Figure 1 is a vertical section.
Figure 2:
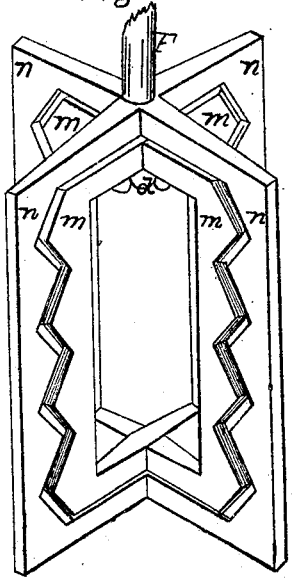
Figure 2, is a perspective view of the frames or dashers.

B, large cog, or drive-wheel.
D and C, small cog-wheels.
P, frame supporting cog-wheels B, D, and C.
O, lid.
V, churn.
E, rod.
F, thimble, or tube.
a, washer.
d, nut.
n, outside frame.
m, inside frame.
c and s, pivots.

I construct my churn V in a square, or round form.

To the lid O I attach the frame, or castings P, which support the cog-wheels, B, D, and C.

To the cog-wheel D I attach the rod E, which passes through the cog-wheel C, and thimble, or tube F, and frame n, into the frame m, the frame m resting upon the pivot c.

I also attach the thimble, or tube F, to the cog-wheels C, and secure the tube, or thimble F, to the top of the frame n, while the frame n rests upon the pivot s in the bottom of the churn V, while both frames, n and m, are held in position by means of the nut d, and pivots s and e, while the head of the cog-wheel C rests against the cross-bar of the frame P, thus holding the frames in position; the whole being so constructed that when the large cog-wheel is caused to revolve by turning of the crank, the small cog-wheels D and C, with the rod E, and tube, or thimble F, with the frames m and n, will revolve in counter or opposite directions.

I also arrange my frames n and m in such a manner, that by removing the nut d, and washer a, the frames n and m will be easily separated for the purpose of cleansing, and at the same time, permitting the frames n and m to be disengaged from the rod F, and tube, or thimble F, thus allowing every part to be easily cleansed, or taken apart when desired.

My invention consists in the combination of devices hereinafter claimed.

1. I claim the combination of frames m and n, constructed with notches, and arranged as described.

2. I claim the combination of the frames n and m, with the frame, or casting P, cog-wheels B, D, and C, rod E, tube, or thimble F, nut d, and pivots e and s, the whole constructed and arranged substantially as described, and for the purpose herein set forth.

JOHN E. FINLEY.

Witnesses:
 PERRY FINLEY,
 S. G. DODGE.